No. 689,813. Patented Dec. 24, 1901.
E. DECOW & J. STEWART.
CRATE FORM.
(Application filed June 12, 1901.)
(No Model.) 2 Sheets—Sheet 1.
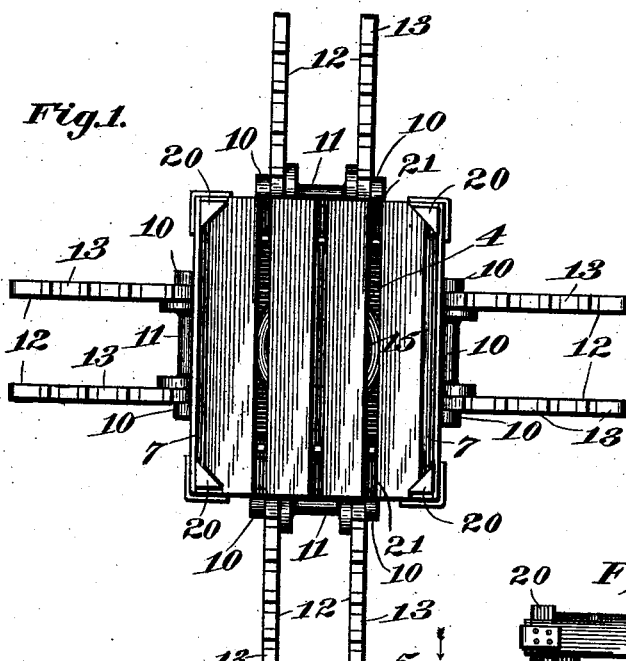
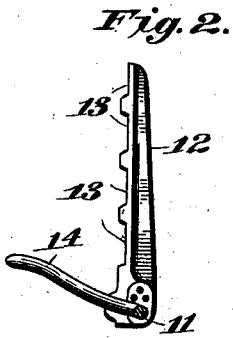
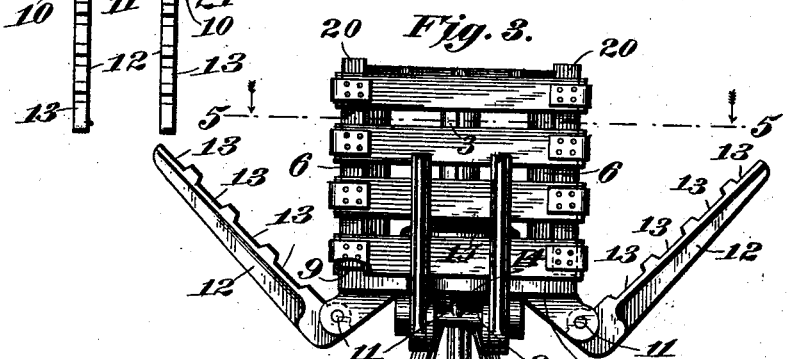
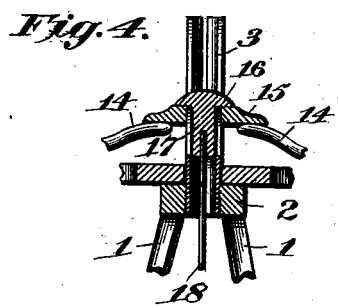
Witnesses
Elmer Seavey.
R. W. Bishop.
Inventors,
Eber Decow,
James Stewart.
By Davis & Davis,
Attorneys.
THE NORRIS PETERS CO., PHOTO-LITHO., WASHINGTON, D. C.

No. 689,813. Patented Dec. 24, 1901.
E. DECOW & J. STEWART.
CRATE FORM.
(Application filed June 12, 1901.)
(No Model.) 2 Sheets—Sheet 2.
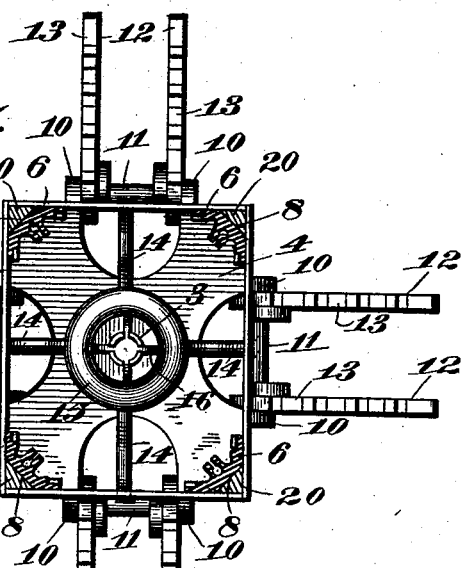
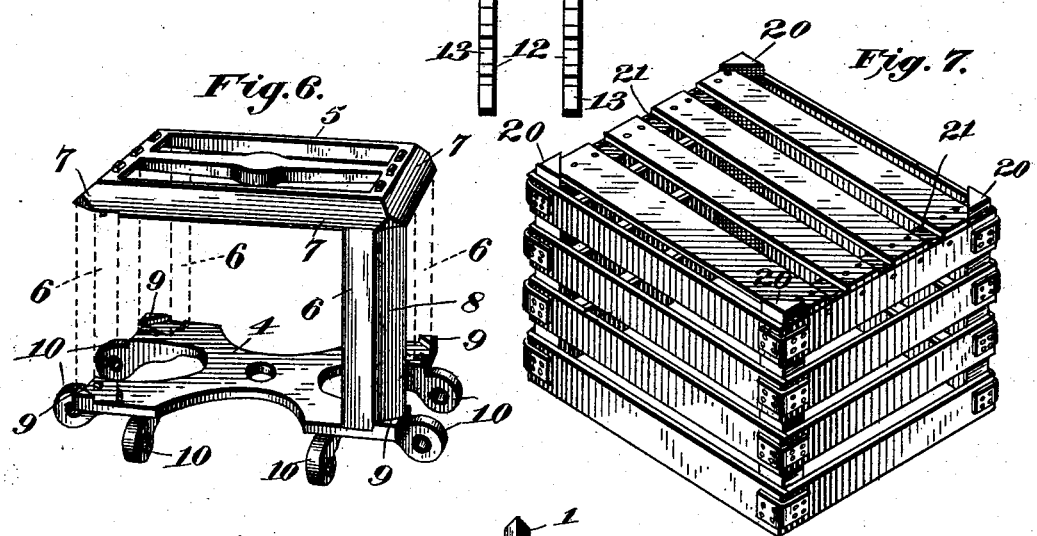
Witnesses
Elmer Leavey.
R. H. Bishop.
Inventors,
Eber Decow,
James Stewart,
By Davis & Davis,
Attorneys.

UNITED STATES PATENT OFFICE.

EBER DECOW AND JAMES STEWART, OF VASSAR, MICHIGAN.

CRATE-FORM.

SPECIFICATION forming part of Letters Patent No. 689,813, dated December 24, 1901.

Application filed June 12, 1901. Serial No. 64,329. (No model.)

*To all whom it may concern:*

Be it known that we, EBER DECOW and JAMES STEWART, citizens of the United States of America, residing at Vassar, in the county of Tuscola and State of Michigan, have invented certain new and useful Improvements in Crate-Making Machines, of which the following is a specification, reference being had to the accompanying drawings, in which—

Figure 1 is a plan view of our machine with a completed crate on the form; Fig. 2, a detail view of one of the slat holding or clamping frames; Fig. 3, a side elevation of Fig. 1; Fig. 4, a detail vertical section through the guide-tube in the center; Fig. 5, a horizontal section taken on the line 5 5 of Fig. 3; Fig. 6, a perspective view in detail of the form, three of the corner-posts being removed and shown in dotted lines; Fig. 7, a perspective view of a crate made on our machine, the crate being turned bottom side up, the position in which it is made on the form; Fig. 8, a horizontal section taken on the line 8 8 of Fig. 3.

The object of this invention is to provide a simple machine for assembling and holding in position the side and end slats and corner-posts and corner-strips of crates while the parts are being nailed, whereby these crates may be rapidly and cheaply assembled, as more fully hereinafter set forth.

The machine is supported on legs 1, which are connected together at their upper ends by a platform 2, screwed into the center of which is an upright split tube 3. The form or former rests upon and is rotatable on platform 2, its base-plate 4 being provided with a central opening up through which tube 3 extends, said tube serving as a pivot around which the form may be revolved by the hand of one of the operators for convenience in nailing. The top frame or plate 5 of the form is connected to and supported on the base-plate by the corner-posts 6 and has its upper outer corners beveled at 7. The outer corners of the post 6 are beveled or inclined their full length, as at 8, these beveled or inclined sides meeting the horizontal inclined sides 7, formed on the top plate or frame. On the base-plate 4, coincident with each inclined face 8, is a triangular lug 9, and this base-plate 4 at each side edge is also provided with a pair of integral depending ears 10, in which is pivoted a shaft 11, carrying at its ends a pair of arms 12, which normally incline upward and outward and are provided on their inner upper faces with slat-receiving notches 13. Each shaft 11 is provided with an inward and upward extending finger 14, which terminates near the central tube 3 and engages under a disk 15. Engaging disk 15 are four radial lugs 16, carried by a block 17, working vertically in the tube 3, said lugs 16 working through the slits in the tube and resting on top of disk 15. The disk 15 is provided with a central opening, which permits it to slide vertically on tube 3. The block 17 is connected by the rod 18 to a foot-lever 19, pivotally supported at the base of the supporting-frame and adapted to be held in its depressed position by ratchet 19'.

The slats for the sides and ends of the crate are placed in notches 13 and are then thrown up against the rectangular form by depressing foot-lever 19, this action serving to depress fingers 14 and throw the slat-carrying frames simultaneously up against the form. The wooden triangular corner-posts 20 of the crate are clamped against the inclined faces 8 by the slats, and the inside wooden corner-strips 21 of the crate, which are triangular in cross-section also, are held against inclined faces 7 of the top frame by the uppermost slats. After the side slats are thus thrown up and the corner-posts 20 and horizontal strips 21 are in place against their respective inclined supports the crate is ready for nailing. The side and end slats are nailed to the corner-posts, and two or more of them are in addition nailed to the horizontal strips 21. The top slats of the crate (or those which are to form the bottom of the crate when the same is finished and removed and inverted) are nailed to strips 21, two or more of these strips being employed, two being shown in Fig. 7. In nailing the crate the nails will be clenched by striking against the inclined faces 7 and 8, and these faces are therefore to be made of a suitable hard metal.

The crate corner-posts 20 rest on lugs 9, so that their upper ends are raised above the uppermost slats and their lower ends are correspondingly raised above the edges of the lowest slats. The reason for this is that when the crate is removed and inverted its projecting ends will form legs or supports for the crate and, furthermore, when the crates are stacked for storage or transportation the legs of one crate will fit down nicely into the corners of the crate next below and rest upon the depressed upper ends of the corner-posts of the crate below, thereby partially nesting the crates.

Having thus fully described our invention, what we claim, and desire to obtain by Letters Patent, is—

1. In combination, a support, a form mounted thereon, a pivoted vertically-swinging frame mounted at each side of the form, and provided with slat-supporting notches and means for simultaneously swinging up these frames against the form and holding them there while the slats are being nailed.

2. In combination, a support, a form mounted thereon, a vertically-swinging slat-supporting frame mounted at each side of the form and provided with an arm, as 14, extending inward under the form, a vertically-movable disk engaging the inner ends of all said arms, and means for drawing down said disk to bring the slat-supporting frames against the form, and means for locking said disk in its depressed position and for limiting its upward movement, for the purposes set forth.

3. In combination, a support, a rectangular horizontally-rotatable form mounted thereon and carrying a vertically-swinging frame at each side provided with slat-holding means and rotatable with the form, and means for moving these slat-carrying frames to and from the form and holding them against the form while the slats are being fastened.

4. In combination, a support, a central slitted tube rising therefrom, a vertically-moving block in said tube and means for depressing it, a vertically-slidable disk working on the tube and engaged by lugs on said block, a form, a slat-supporting frame hinged at each side of the form and provided with a finger extending inward under said disk, for the purposes set forth.

5. In combination, a support, a form mounted thereon and having corner-posts whose outer corners are beveled off vertically to form nail-clenching surfaces, and devices for holding the crate-slats and crate-posts against said posts while being nailed.

6. In combination, a support, a rectangular form having a vertical post at each corner whose outer corner is beveled off vertically to receive the triangular wooden posts of the crate and to clench the nails, triangular lugs, as 9, on the base of the form coincident with the beveled corners of the posts, and means for holding the slats and crate-posts in position against said corner-posts while being nailed.

7. In combination, a support, a form thereon having a substantially rectangular shape and composed of a base and a top frame connected by vertical corner-posts, the corner-posts having their outer corners beveled off vertically and two or more of the corner-bars of the upper frame having their outer corners beveled off, these beveled corners meeting the beveled corners of the vertical posts, and means for holding the slats and posts and corner-strips of the crate in position while being nailed.

EBER DECOW.
JAMES STEWART.

Witnesses:
CHAS. C. HILL,
W. N. JOHNSON.